US008253584B2

(12) United States Patent
Rozenblit et al.

(10) Patent No.: US 8,253,584 B2
(45) Date of Patent: Aug. 28, 2012

(54) ELECTRIC DIPOLE TRANSMISSION SYSTEM

(75) Inventors: Vlad Rozenblit, Houston, TX (US); Vadim Buryakovsky, Houston, TX (US); Eugene Fiterman, Houston, TX (US); William Goodman, Los Altos, CA (US)

(73) Assignee: R&B Industrial Supply Co., Houston, TX (US)

( * ) Notice: Subject to any disclaimer, the term of this patent is extended or adjusted under 35 U.S.C. 154(b) by 589 days.

(21) Appl. No.: 12/538,106

(22) Filed: Aug. 7, 2009

(65) Prior Publication Data

US 2010/0033344 A1 Feb. 11, 2010

Related U.S. Application Data

(60) Provisional application No. 61/087,163, filed on Aug. 7, 2008.

(51) Int. Cl.
*G01V 3/00* (2006.01)

(52) U.S. Cl. .................................. 340/853.1; 340/854.6

(58) Field of Classification Search ............... 340/853.1, 340/854.6, 855.3, 853.5, 853.7, 854.4, 870.04, 340/854.8, 854, 854.9; 375/260; 367/81, 367/83
See application file for complete search history.

(56) References Cited

U.S. PATENT DOCUMENTS

2003/0147360 A1 8/2003 Nero et al.
2005/0183889 A1 8/2005 Marsh
2006/0225880 A1 10/2006 Radzinski et al.
2007/0079988 A1 4/2007 Konschuh et al.
2007/0247329 A1 10/2007 Petrovic et al.
2007/0285274 A1* 12/2007 Esmersoy .................. 340/853.5
2008/0068929 A1 3/2008 Hahn et al.

* cited by examiner

*Primary Examiner* — Joseph Lauture
(74) *Attorney, Agent, or Firm* — Reches Patents

(57) ABSTRACT

An electric dipole transmission system includes an uphole dipole assembly adapted for receiving downhole telemetry data. The uphole dipole assembly includes a gap sub, an electric dipole transmitter, a battery stack and a wireline receiver. A short hop receiver assembly is connected to the lower end of the uphole dipole assembly by a wireline. A downhole dipole assembly operatively connected to the uphole dipole assembly includes a short hop transmitter, a battery stack and a sensor assembly.

11 Claims, 3 Drawing Sheets

ELECTRIC DIPOLE TRANSMISSION SYSTEM

CROSS-REFERENCE TO RELATED APPLICATION

This application claims the benefit of U.S. Provisional Application Ser. No. 61/087,163 filed Aug. 7, 2008, which application is incorporated herein by reference.

BACKGROUND OF THE INVENTION

The present invention relates to a dipole transmission system and method for use in gas and oil wells. More particularly, the present invention relates to a dipole transmission system having one or more uphole assemblies and a single downhole assembly connected by a wireline and short hop data link enabling data transmission from the downhole assembly to the uphole assembly.

In the process of drilling an oil well, quite often it is desirable to drill the first section of the well vertically from the surface. When the bore hole is positioned near the oil producing formation strata, a deviated bore hole may be drilled in a non-vertical or horizontal direction. Deviation of the borehole is desirable so as to expose more of the bore hole to the oil producing formation.

In other cases it is desirable to re-complete existing producing oil wells by drilling new sidetracks extending out horizontally or at an angle from the existing vertical bore hole. Producing wells are typically cased with a steel lining. To enable a sidetrack to be drilled, a window is first cut in the casing to allow the drill bit and drill string to advance from the cased vertical hole into the formation.

In either of the above cases the direction of the borehole deviation or sidetrack must be measured and transmitted to the surface as drilling proceeds. It is also often desirable to measure and transmit to the surface other data concerning the borehole physical conditions such as temperature, pressure, etc.

A known method of transmitting downhole data to the surface is the use of an electric dipole transmitter, which functions by applying a phase modulated low frequency voltage across an electrically insulated section of the drill string (a gap sub). The applied voltage causes electric currents to be injected into the downhole formation. The transmitting gap sub is normally mounted downhole 10 to 20 meters behind the drill bit. The electric dipole method of transmitting data to the surface has many advantages over alternative methods (e.g. mud pulse telemetry), namely, higher speed, higher reliability due to the absence of moving parts, and lower operating cost.

If the formation resistivity from downhole to the surface is in a moderate range (typically 0.5 to 20 ohm-meters) the downhole injected currents can usually propagate to the surface where they can be detected by electrodes driven into the ground and connected to the top of the drill string. Such is not the case when the working liquid (mud) has a high content of gas. Overly gaseous liquids reduce the intensity of the returning signal to an undetectable point. Also, if the formation resistivity near the gap sub or in formation strata above the gap sub is very high or very low, the injected formation currents may not propagate to the surface with enough strength to provide a detectable signal.

An additional factor affecting the dipole signal strength at the surface is the depth of the transmitting gap sub. As the borehole depth increases, the dipole signal strength at the surface decreases and at some point becomes too weak to reliably detect.

The ability to work with non-Newtonian liquids (liquids in which the viscosity changes with the applied shear stress) containing high levels of gas is an obvious application for working with underbalanced systems. It is a desirable goal to develop methods of overcoming the depth and formation resistivity limitations of the electric dipole transmission methods discussed above.

SUMMARY OF THE INVENTION

In accordance with a preferred embodiment of the present invention, an electric dipole transmission system includes an uphole dipole assembly adapted for receiving downhole telemetry data. The uphole dipole assembly includes a gap sub, an electric dipole transmitter, a battery stack and a wireline receiver. A short hop receiver assembly is connected to the lower end of the uphole dipole assembly by a wireline. A downhole dipole assembly operatively connected to the uphole dipole assembly includes a short hop transmitter, a battery stack and a sensor assembly.

BRIEF DESCRIPTION OF THE DRAWINGS

So that the manner in which the above recited features, advantages and objects of the present invention are attained can be understood in detail, a more particular description of the invention briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

DETAILED DESCRIPTION OF A PREFERRED EMBODIMENT

Figure 1:
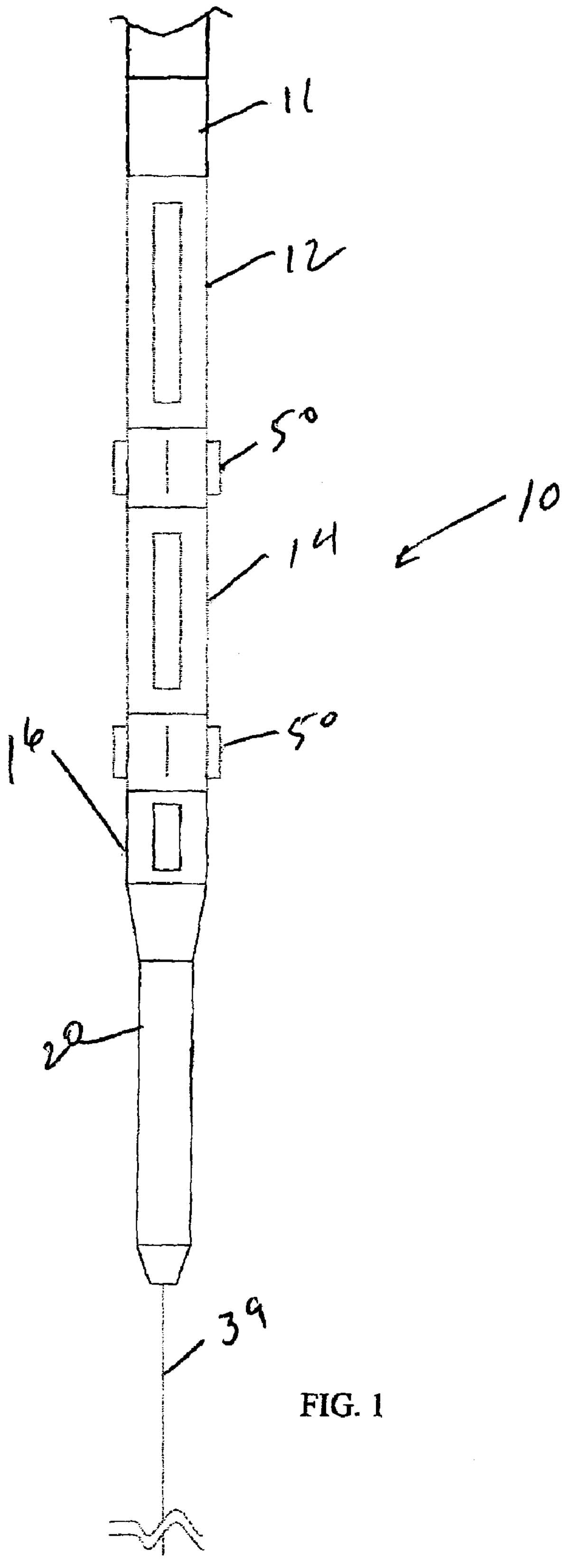
FIG. 1 is a schematic diagram showing the uphole assembly of the electric dipole transmission system of the present invention.

Referring first to FIG. 1, the uphole electric dipole assembly is generally identified by the reference numeral 10. The uphole dipole assembly 10 is mounted high in the bore hole and is typically positioned above any high or low resistivity formation strata that may block the transmission of downhole data to surface detection equipment.

The uphole electric dipole assembly 10 includes a gap sub 11, an electric dipole transmitter 12, a battery stack 14, and a wireline receiver 16. The uphole assembly components are provided with pin and box ends or the like for connection in vertical alignment. A rope socket 20 is connected to the lower end of the wireline receiver 16.

Figure 2:
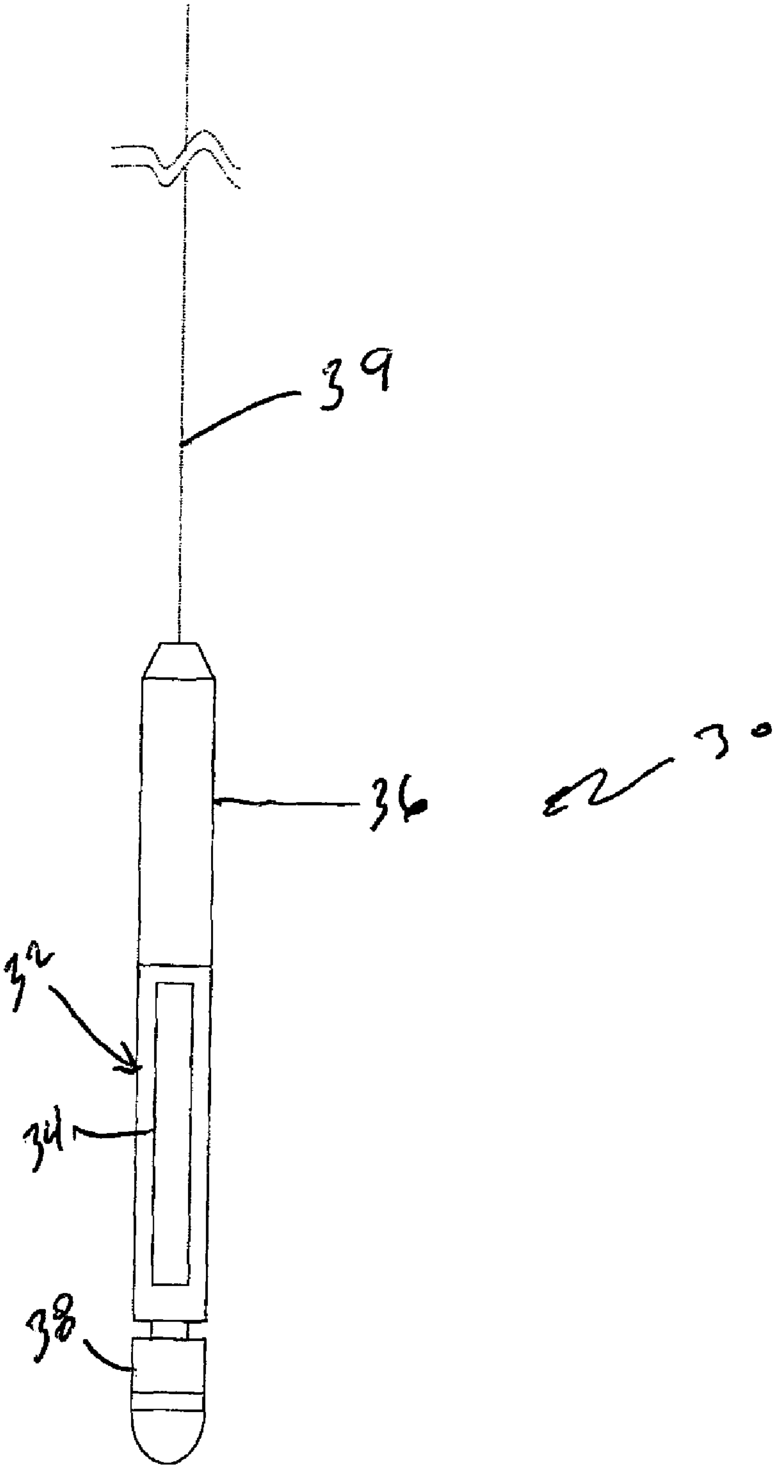
FIG. 2 is a schematic diagram showing the short hop receiver assembly of the electric dipole transmission system of the present invention.

Referring now to FIG. 2, the short hop receiver assembly 30 of the invention is shown. The short hop receiver assembly 30 includes a substantially elongate cylindrical body 32 housing a weight bar (not shown in the drawings) and a short hop receiver 34. A rope socket 36 is connected to the upper end of the short hop receiver body 32 and a bullnose plug 38 or the like is connected to the lower end of the short hop receiver body 32. The short hop receiver assembly 30 is connected to the uphole dipole assembly 10 by a wireline 39. The upper and lower ends of the wireline 39 include a cablehead interface that enables it to be connected to the rope sockets 20 and 36 connected to the uphole dipole assembly 10 and short hop receiver assembly 30, respectively. The short hop receiver 34 is powered through the wireline 39 by batteries 14 housed in the uphole dipole assembly 10.

Figure 3:
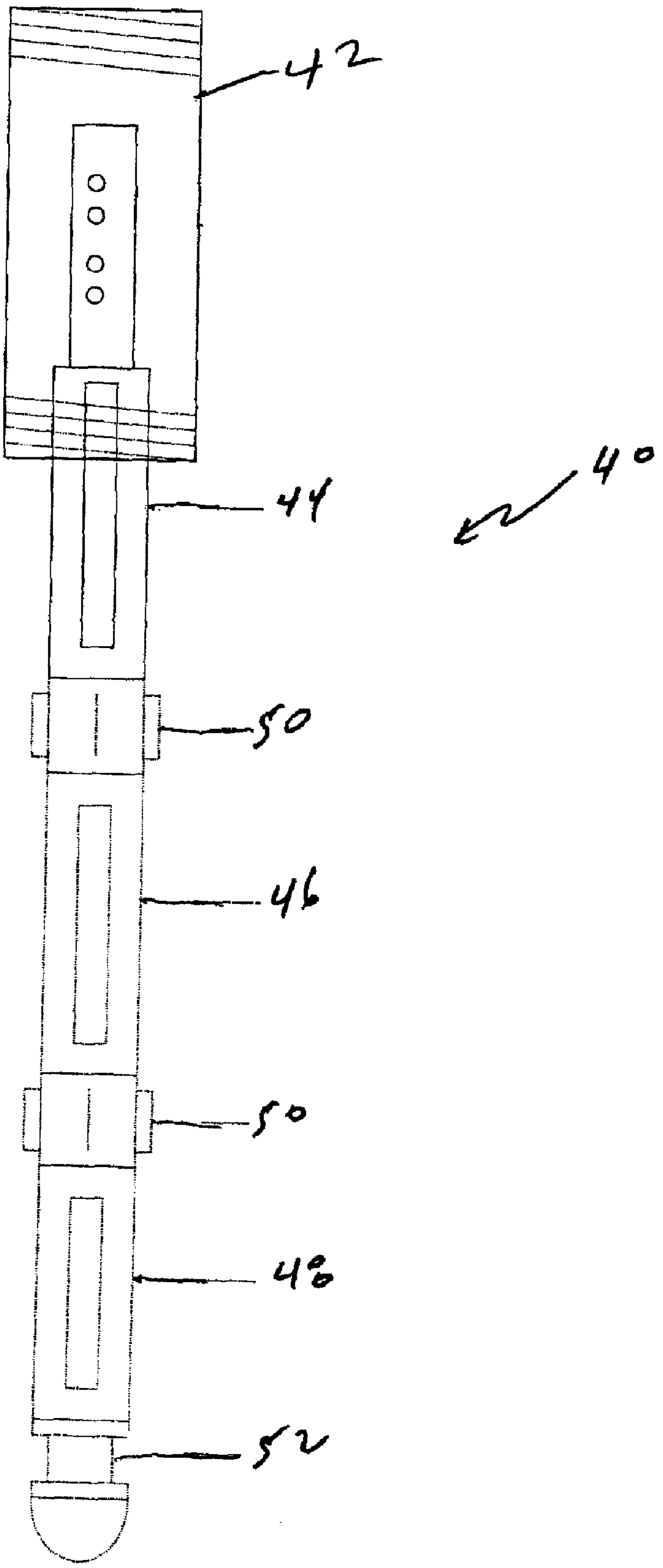
FIG. 3 is a schematic diagram showing the downhole assembly of the electric dipole transmission system of the present invention.

Referring now to FIG. 3, the downhole assembly 40 of the present invention is bolted or otherwise secured to a nonmagnetic drill collar 42. The downhole assembly 40 includes a short hop transmitter 44, a battery stack 46 and a sensor assembly 48. The sensor assembly 48 houses one or more sensors for measuring borehole conditions near the drill bit, such as temperature, pressure, directional, and gamma sensors and the like. The downhole assembly 40 components are provided with pin and box ends or the like for connection in vertical alignment. The lower end of the downhole assembly 40 is capped with a bullnose plug 52 or the like. Centralizers 50 incorporated in the dipole assemblies 10 and 40 center the dipole assemblies within the drill string.

During drilling, telemetry data from sensors housed in the sensor assembly 48 is electrically transmitted to the short hop transmitter 44, which encodes the data and broadcasts it to the short hop receiver 34. The transmission distance between the short hop transmitter 44 and short hop receiver 34 is typically 20 cm when they are connected, and up to a few meters when the short hop receiver assembly 30 is disconnected from the downhole assembly 40. The minimum separation distance between the short hop transmitter 44 and short hop receiver 34 is achieved by lowering the short hop receiver assembly 30 on the wireline 39 until the bullnose connector 38 mechanically locks with the upper end of the downhole dipole assembly 40. Upon receipt of data transmissions from the short hop transmitter 44, the short hop receiver 34 retransmits the data through the wireline 39 to the uphole wireline receiver 16.

It will be observed that when short hop receiver 34 and short hop transmitter 44 are locked together, the transmitting and receiving antennas thereof are in close proximity to each other. This enables reliable transmission of data transmissions in the presence of a high vibration drilling environment. In addition, the close proximity of the two antennae enables reliable transmission inside the magnetic well casing which strongly attenuates the transmitted signal for widely spaced antennae. Data received uphole by the wireline receiver 16 is logged to memory and then transmitted to surface equipment by applying low frequency phase modulated voltages across the gap sub 11.

On the surface, a receiving antenna detects the electric signal generated by the currents induced in the formation by the electrical voltages impressed across the gap sub 11. For further processing and display, surface signal-conditioning electronics filter and amplify the received signal before transmitting it to a surface computer.

In order to enable the electric dipole system as described in this disclosure to be used at very great depths the top gap sub assembly may be equipped with a short hop transmitter thus enabling an additional wireline link to be established. Utilizing multiple wireline links eliminates any depth limitations for the dipole transmission system of the present invention and facilitates the use of standard length wireline connections that are reusable. Another benefit of the dipole transmission system of the present invention is that it can down link. In other words, the parameters of the system can be changed simply by sending a signal from the surface to the downhole assembly components.

While a preferred embodiment of the invention has been shown and described, other and further embodiments of the invention may be devised without departing from the basic scope thereof, and the scope thereof is determined by the claims which follow.

The invention claimed is:

1. An electric dipole transmission system for use with a drill string to transmit downhole data to the surface, comprising:

a) an uphole electric dipole assembly including a gap sub, an electric dipole transmitter, a battery stack and a wireline receiver operatively connected;

b) a short hop receiver assembly including a weight bar and a short hop receiver;

c) a wireline having an upper end connected to said uphole dipole assembly and a lower end connected to said short hop receiver assembly; and d) a downhole assembly mounted on a nonmagnetic drill collar, said downhole assembly including a short hop transmitter, a battery stack and a sensor assembly operatively connected.

2. The dipole transmission system of claim 1 wherein said short hop receiver and said short hop transmitter are in close proximity upon locking engagement of said short hop receiver assembly and said downhole assembly.

3. The dipole transmission system of claim 1 wherein said wireline receiver is a wireline frequency shift key receiver.

4. The dipole transmission system of claim 3 wherein said short hop receiver assembly is powered by said battery assembly of said uphole dipole assembly.

5. The dipole transmission system of claim 1 wherein said short hop receiver and said short hop transmitter include antennae separated by a distance of few centimeters to a few meters.

6. The dipole transmission system of claim 1 including two or more wireline links for data transmission at great depths.

7. The dipole transmission system of claim 1 wherein operational parameters may be down linked to said downhole dipole assembly.

8. A method for transmitting borehole data to surface equipment, comprising the steps of:

a) mounting an uphole dipole assembly within a drill string proximate an upper end of the borehole;

b) suspending a short hop receiver assembly on a wireline having an upper end connected to a lower end of said uphole dipole assembly;

c) securing a downhole dipole assembly to a nonmagnetic drill collar of the drill string;

d) connecting said shot hop receiver assembly to said downhole assembly;

e) transmitting borehole data collected by said downhole dipole assembly to said short hop receiver assembly;

f) retransmitting said collected borehole data via said wireline to said uphole dipole assembly; and g) logging said collected data to memory and transmitting said data to the surface equipment.

9. The method of claim 8 wherein said short hop assembly includes a short hop receiver and said downhole dipole assembly includes a shot hop transmitter and further including securing said short hop receiver in close proximity to said short hop transmitter.

10. The method of claim 9 including limiting the distance separating said short hop receiver and said short hop transmitter to four meters or less.

11. The method of claim 8 including the step of powering said short hop receiver assembly by a battery assembly housed in said uphole dipole assembly.

* * * * *